UNITED STATES PATENT OFFICE.

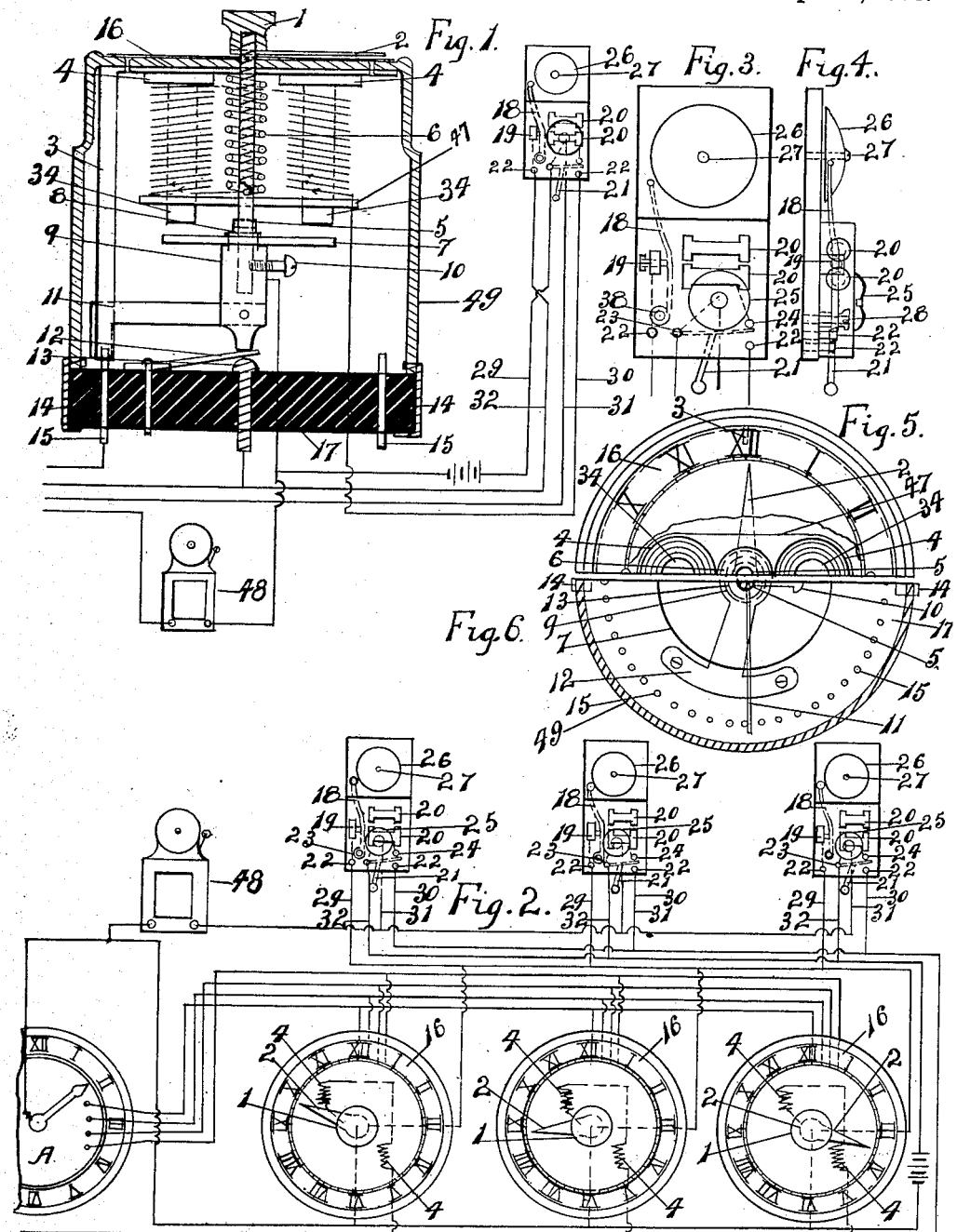
E. PICKEL.
ANNUNCIATOR.
APPLICATION FILED NOV. 18, 1907.
919,377. Patented Apr. 27, 1909.

ELSWORTH PICKEL, OF PORTLAND, OREGON.

ANNUNCIATOR.

No. 919,377.　　　Specification of Letters Patent.　　　Patented April 27, 1909.

Application filed November 18, 1907. Serial No. 402,685.

*To all whom it may concern:*

Be it known that I, ELSWORTH PICKEL, a citizen of the United States, residing at Portland, in the county of Multnomah and State of Oregon, have invented a new and useful Annunciator, of which the following is a specification.

My invention relates to improvements in automatic annunciators the parts so arranged in combination, that an alarm may be turned in from a given point to a given point at the same time, or in one, or several points, at different times, also so arranged that from the one or several points, alarms may be returned to the central station.

The annunciator is so arranged that when it is so desired, the annunciator may be set at a period of time in advance of that when the alarm is to be sounded, when the desired time is reached, a clock makes the contact, therefore the alarm is sounded in the one or several places as may be desired. It is also so arranged that when the alarm is sounded at the one or several points when a lever is actuated, the pointer on the annunciator will immediately return to zero on the central station dial, thus indicating that the alarm has been received and recorded by the operator at the one or several points.

I attain these objects by the mechanism illustrated in the accompanying drawing in which—

Figure 1 is a partial vertical section of the mechanism. Fig. 2 is a front elevation of the annunciators shown in position as they will be placed and the method of wiring them to the bell or sounding device. Fig. 3 is a front view of the bell, and Fig. 4 is a side view of the same. Fig. 5 is a half front elevation of the central station annunciator, and Fig. 6 is a partial cross section through the same.

Similar figures refer to similar parts throughout the several views.

1 is the projecting portion, or operating handle of the main shaft, and by the use of which the operator in the central station is enabled to set the pointer 2 at the desired time as indicated by the dial. 2 is rigidly fastened to 1 and is the arm pointer reaching to the periphery of the dial indicating the time set for.

3 is the spring cushion against which the projecting arm 11 comes in contact when the call is answered and the pointer 2 returns to zero.

4 is the magnet.

5 is the main shaft.

6 is a spiral spring which is for the purpose of causing—first the pointer to return to zero—second to hold the shaft in the required position when so adjusted.

7 is the magnet disk which the magnet 4 acts upon and which causes the shaft 5 to move in the direction of its long axis, thereby causing the arm 11 to be released and therefore the return of the pointer arm to the zero position, for as soon as 11 is released the spring 6 rotates the shaft 5 until 11 comes in contact with 3.

8 is a portion of 9 which passes through 7 and comes in contact with cross bar 47. This projects a greater distance above 7 than the distance between 34 and 7, thus when the magnet acts, the disk 7 never comes in direct contact with the magnet 34, thus lessening the friction.

9 is a lower portion of the shaft, the extreme end of which comes in contact with 12. When pressed down, it in turn presses 12 down against terminal 13, thus completing a contact and therefore a circuit.

10 is a set screw which fastens 9 to the main shaft 5.

11 is the contact arm which is fastened to 9. This enables the central station operator to call any desired place at any and all times.

12 is a spring which holds the revolving mechanism away from terminal 13 excepting when a sufficient pressure is applied upon the revolving shaft 5 at 1.

13 is the terminal contact point of 32 which passes through insulation 17 and a contact through it enables the operator to call at any desired time.

14 are clamps that hold 17 in proper relation with the inclosure case 49. They do this by passing through openings near the top of 49 up and over 17.

15 are metal contacts that pass through the insulating material 17 spaced equally distant apart and to the outer ends of which electric wires are attached and against the inner ends of which the arm 11 comes in contact, thus completing the circuit at the time where placed.

16 is the dial upon which the increments of time are marked.

17 is the insulating material through which all of the electric terminals pass; it also serves the purpose of closing the lower end of the case, thus eliminating dust from the interior.

18 is the bell weight. 19 the cushion against which it strikes. 20 the magnet for operating the same. 21 the lever on the switch for making and breaking the circuit. 22 the terminals for the wires. 23 the pivot for 21. 24 is the other terminal.

25 is a push button which enables the party called to break the circuit, which is done by passing the circuit through magnet 34 which disengages arm 11 with contact points 15.

26 is the bell which is rung at the desired time as shown by the setting of pointer 2.

27 is a means of fastening the bell to its support.

28 is a terminal point by means of which the circuit is closed when the push button 25 is pressed down against it.

29 is an electric wire connecting the central terminal 9 with terminal 23 on the bell.

30 is wire connecting 22 with magnet 34.

31 is wire connecting magnet 20 with terminal in central station.

32 is wire connecting 22 with central station terminal 13.

34 is the magnet that operates the shaft 5 through disk 7 to which is attached contact arm 11 and is for the purpose of disengaging it from terminal 13; the call is answered from the point where it was sounded in.

38 is the pivotal center about which 18 oscillates.

47 is the cross bar through which passes the core of the magnet and the shaft 5, thus holding 5 in alinement.

48 is an auxiliary bell and 49 is the casing in which the mechanism is inclosed.

It will be understood that the parts 1, 5, and 11, of the annunciators virtually constitute a switch the position of which is adjusted to correspond with certain time points on clock A. For the above reason said parts may be termed a clock switch for the purposes of the present description. The clock A is suitably connected with the circuit wires above described and is adapted to connect contacts at regular intervals of time whereby, if the switches are properly adjusted, an alarm, or alarms in different rooms, will be sounded.

I claim—

1. In an automatic annunciator, the combination of a clock, a switch having a face similar to the clock face, means for setting the switch, an alarm in a different room, said clock switch and alarm being in an electric circuit, and electric means in said room to release the switch.

2. In an automatic annunciator, the combination of an electric circuit including a clock for closing same, a cloak switch, means for setting said switch, an alarm in a different room and included with the switch in an electric circuit, an electro-magnet arranged to coact with the switch, and means in said room for energizing said magnet to release said switch.

3. In an automatic annunciator, the combination of an electric circuit including a clock for closing same, a clock switch, means for normally holding same in a certain position, means for locking the switch in an adjusted position in which it connects contacts in the circuit including the clock, an alarm in a different room and electrically connected with the switch, and means in said room for restoring the switch to normal position after the alarm has been sounded.

4. In an automatic annunciator, the combination of a clock included in an electric circuit, a clock switch controlling said circuit, means for setting said switch in adjusted positions in any of which the aforesaid circuit is closed, means for holding the switch in a predetermined position normally, an alarm in a different room, and means in said room for breaking said circuit to stop the operation of the alarm.

5. In an automatic annunciator, the combination of a clock included in an electric circuit, a clock switch controlling said circuit, means for setting said switch in adjusted positions in any of which the aforesaid circuit is closed, means for holding the switch in a predetermined position normally, an alarm in a different room, means in said room for breaking said circuit to stop the operation of the alarm, and means for returning the switch to its normal position when said circuit is broken.

6. In an automatic annunciator, the combination of a clock included in an electric circuit, a clock switch controlling said circuit, means for setting said switch in adjusted positions in any of which the aforesaid circuit is closed, means for holding the switch in a predetermined position normally, an alarm in a different room, another electric circuit including an electro-magnet, means in said room for closing the last mentioned circuit to energize the magnet and release the switch, and means for simultaneously restoring the switch to its normal position when said magnet is energized.

7. In an automatic annunciator, the combination of a clock, included in an electric circuit, a clock switch controlling said circuit, means for setting said switch in adjusted positions in any of which the aforesaid circuit is closed, means for holding the switch in a predetermined position normally, an alarm in a different room, the aforesaid means holding the switch in its normal position comprising a spring, an electro-magnet arranged adjacent to said switch, an armature disk carried by the switch for coöperation with the magnet, and means in the room with the alarm for energizing the magnet to move the switch and break the circuit including the said alarm.

8. In an automatic annunciator, the combination of a clock included in an electric circuit, a clock switch comprising a shaft, an operating handle applied to said shaft, a circuit closing arm carried by said shaft, a plurality of spaced electrical contacts adapted to engage the aforesaid arm, spring means coacting with the shaft to hold the arm in a predetermined position, an armature disk carried by said shaft, an electro-magnet coöperating with said disk, an alarm in a different room in the electric circuit of the switch mechanism, and electric means in said room for energizing the magnet to attract the disk and release the arm of the switch from the contact with which said arm may be engaged.

9. In an automatic annunciator, the combination of a clock included in an electric circuit, a clock switch comprising a shaft, an operating handle applied to said shaft, a circuit closing arm carried by said shaft, a plurality of spaced electrical contacts adapted to engage the aforesaid arm, spring means coacting with the shaft to hold the arm in a predetermined position, an armature disk carried by said shaft, an electro-magnet coöperating with said disk, an alarm in a different room in an electric circuit of the switch mechanism, and electric means in said room for energizing the magnet to attract the disk and release the arm of the switch from the contact with which said arm may be engaged, and the spring means coöperating with the shaft aforesaid being connected to restore the arm to its normal position on release thereof as described.

ELSWORTH PICKEL.

Witnesses:
C. L. PARRISH,
E. H. SMITH.